United States Patent [19]
Hartmann et al.

[11] Patent Number: 6,047,002
[45] Date of Patent: Apr. 4, 2000

[54] COMMUNICATION TRAFFIC CIRCLE SYSTEM AND METHOD FOR PERFORMING PACKET CONVERSION AND ROUTING BETWEEN DIFFERENT PACKET FORMATS INCLUDING AN INSTRUCTION FIELD

[75] Inventors: Alfred C. Hartmann, Round Rock, Tex.; Carl K. Wakeland, Scotts Valley, Calif.

[73] Assignee: Advanced Micro Devices, Inc., Sunnyvale, Calif.

[21] Appl. No.: 09/227,509

[22] Filed: Jan. 6, 1999

Related U.S. Application Data

[63] Continuation of application No. 08/783,433, Jan. 16, 1997, abandoned.

[51] Int. Cl.$^7$ .................................................. H04L 12/56
[52] U.S. Cl. ......................... 370/466; 370/395; 370/401; 370/362
[58] Field of Search .................................... 370/466, 362, 370/407, 401, 404, 395; 709/220, 229, 248

[56] References Cited

U.S. PATENT DOCUMENTS

| | | |
|---|---|---|
| 4,468,734 | 8/1984 | Lanier et al. . |
| 5,251,205 | 10/1993 | Callon et al. . |
| 5,339,421 | 8/1994 | Housel, III . |
| 5,394,389 | 2/1995 | Kremer . |
| 5,423,002 | 6/1995 | Hart . |

(List continued on next page.)

OTHER PUBLICATIONS

Kim, et al, "A Relational Dataflow Database Machine Based on Heirarchical Ring Network," Korea Advanced Institute of Technology, Proceedings of the International Conference on Fifth Generation Computer Systems, 2984, pp. 489–496.

(List continued on next page.)

*Primary Examiner*—Hassan Kizou
*Assistant Examiner*—Mitchell Slavitt
*Attorney, Agent, or Firm*—Conley, Rose & Tayon PC; Jeffrey C. Hood; Louis H. Iselin

[57] ABSTRACT

A communication system which includes more efficient packet conversion and routing for improved performance and simplified operation. The communication system includes one or more inputs for receiving packet data and one or more outputs for providing packet data. In one embodiment, the present invention comprises a "traffic circle" architecture for routing packet data and converting between different packet formats. In this embodiment, the system includes a data bus configured in a ring or circle. A plurality of port adapters or protocol processors are coupled to the ring data bus or communication circle. Each of the port adapters are configurable for converting between different types of communication packet formats. In the preferred embodiment, each of the port adapters are operable to convert between one or more communication packet formats to/from a generic packet format. The common generic packet format is then provided on the circular bus for circulation on the communication traffic circle between respective ones of the port adapters. In a second embodiment, the present invention comprises a cross-bar switch communication channel. This system is designed to receive a plurality of communications channels comprising packet data. The communication system comprises a plurality of protocol converters or protocol processors for converting possibly differing communication protocols or differing packet formats to/from a common generic packet format. Each of the protocol converters are coupled to a single-sided cross-bar switch to transmit/receive data to/from other protocol converters. The single-sided cross-bar switch is operable for interconnecting the multiple communications paths between arbitrary pairs of communications ports. The system preferably includes arbitration and control logic for establishing and removing connection paths within the cross-bar switch. In the preferred embodiment, the single-sided cross-bar switch is configurable for different transmission paths for added flexibility.

21 Claims, 14 Drawing Sheets

U.S. PATENT DOCUMENTS

| | | |
|---|---|---|
| 5,490,252 | 2/1996 | Macera et al. . |
| 5,623,696 | 4/1997 | Johnson et al. . |
| 5,632,016 | 5/1997 | Hoch et al. . |
| 5,642,337 | 6/1997 | Oskay et al. . |
| 5,687,393 | 11/1997 | Brown et al. . |
| 5,761,516 | 6/1998 | Rostoker et al. . |
| 5,878,265 | 3/1999 | Hartmann . |
| 5,881,248 | 3/1999 | Mergard . |
| 5,896,383 | 4/1999 | Wakeland . |

OTHER PUBLICATIONS

Su, et al, "Adaptive Fault–Tolerant Deadlock–Free Routing of the Slotted Ring Multiprocessor," IEEE Transactions on Computers, vol. 45, No. 6, Jun. 1996, pp. 666–683.

Gustavson, D.B., "Scalable Coherent Interface and Related Standards Projects," IEEE vol. 12, No. 1, pp. 10–22, Feb. 1992.

Cha, et al, "Simulated Behaviour of Large Scale SCI Rings and Tori," Depts. of Engineering and Computer Science, University of Cambridge, United Kingdom, pp. 1–21, Proceedings of 5th IEEE Symposium on Parallel and Distributed Processing, Dallas, Texas, Dec. 1993.

Franklin, et al, "ARB: A Hardware Mechanism for Dynamic Reordering of Memory References," IEEE Transactions on Computers, vol. 45, No. 5, May 1996, pp. 552–571.

Barroso, et al, "Performance Evaluation of the Slotted Ring Multiprocessor," IEEE Transactions on Computers, vol. 44, No. 7, Jul. 1995, pp. 878–890.

Bhuyan, et al, "Approximate Analysis of Single and Multiple Ring Networks," IEEE Transactions on Computers, vol. 38, No. 7, Jul. 1989, pp. 1027–1040.

Arden, et al, "Analysis of Chordal Ring Network," IEEE Transactions on Computers, Vo. C–30, No. 4, Apr. 1981, pp. 291–301.

Kubiatowicz et al, "The Alweife CMMU: Addressing the Multiprocessor Communications Gap," Extended Abstract for Hot Chips '94, 1994, pp. 1–3.

Kubiatowicz et al, "The Anatomy of a Message in the Alewife Multiprocessor," Proceedings of the International Conference on Supercomputing (ICS) 1993, pp. 195–206, Jul. 1993.

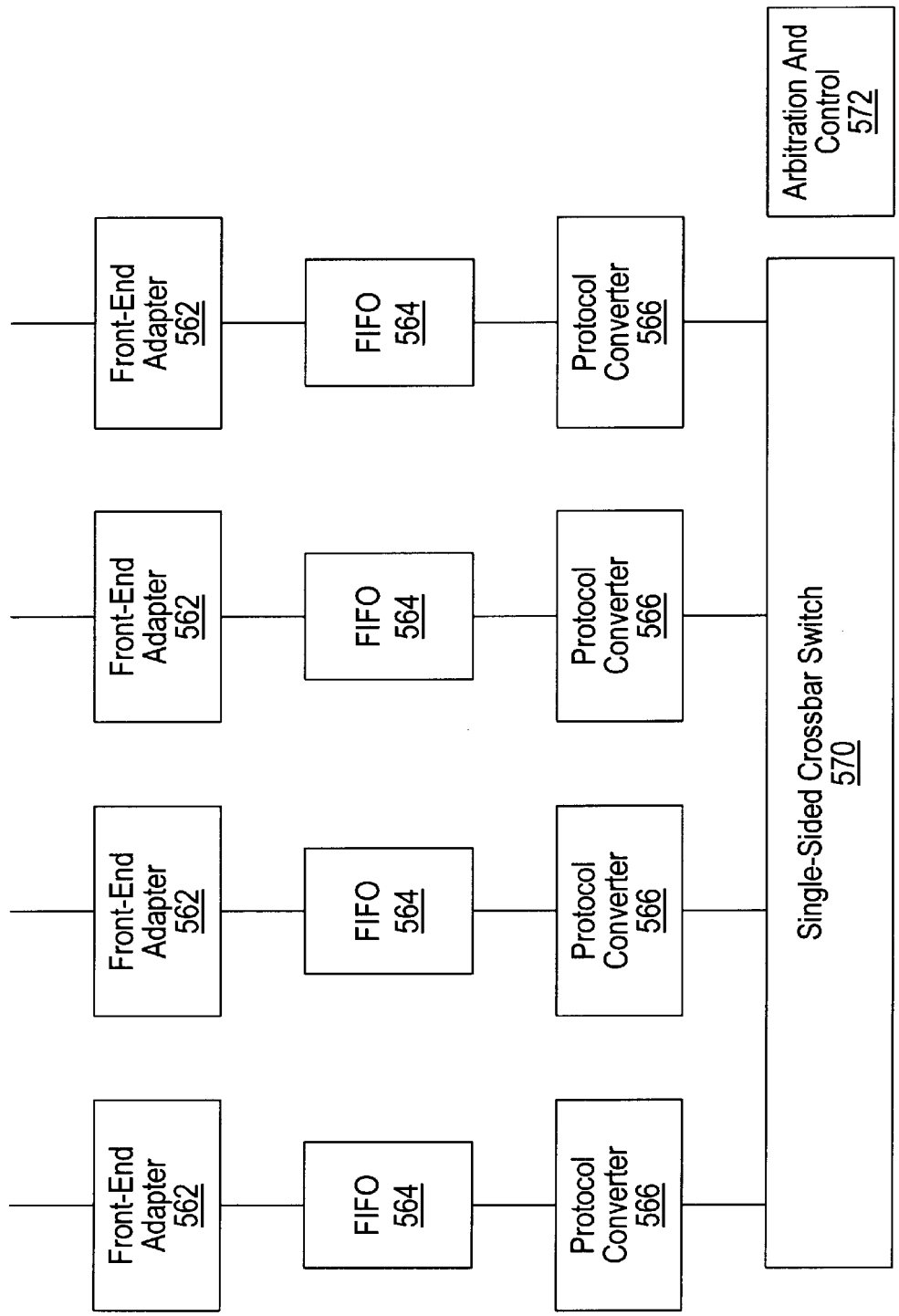

COMMUNICATION TRAFFIC CIRCLE SYSTEM AND METHOD FOR PERFORMING PACKET CONVERSION AND ROUTING BETWEEN DIFFERENT PACKET FORMATS INCLUDING AN INSTRUCTION FIELD

Priority Data

This application is a continuation of U.S. patent application Ser. No. 08/783,433, entitled, "Communication Traffic Circle System and Method for Performing Packet Conversion and Routing Between Different Packet Formats", filed Jan. 16, 1997, now abandoned.

FIELD OF THE INVENTION

The present invention relates to communication systems architectures, and more particularly to a communication system architecture which includes a traffic circle architecture and/or crossbar switch architecture for improved protocol conversion and routing. The system further includes a generic packet format which simplifies packet conversions and enables direct transmittal of packets/frames between two or more communication controllers supporting different packet/frame formats.

DESCRIPTION OF THE RELATED ART

In today's information-based society, many individuals desire remote data connectivity to an office or remote data site. Business people who travel desire to "stay connected" to the corporate office as much as possible. In addition, a current trend in business is the "telecommuter", e.g., an employee who works primarily at home and is remotely connected to the corporate office. Another recent trend in business is referred to as the "remote small office" (RSO) or "branch office", wherein a group of workers or employees are in a location remote from the company's headquarters or corporate office and are electronically connected to the corporate office. This trend in remote connectivity is often referred to as SOHO (small office/home office) connectivity.

In each of the above situations, the remote individuals desire remote and transparent connectivity to the corporate office or a remote data site, including connectivity to the corporate office local area network (LAN). In general, PC based systems and local area networks (LANs) have improved the options for remote connectivity. In general, personal computers and LANs facilitate remote access to computing resources. Remote connectivity is also made possible with the arrival of affordable, reliable, digital telecommunication services and inexpensive network hardware.

There are a number of standards used in digital telecommunications, including TCP/IP, Ethernet, HDLC, ISDN, Lap B, ATM, X.25, Frame Relay, Digital Data Service, FDDI (Fiber Distributed Data Interface), and T1, among others. Many of these standards employ different packet and/or frame formats. The term "frame" generally refers to encapsulated data at OSI layer 2, including a destination address, control bits for flow control, the data or payload, and CRC (cyclic redundancy check) data for error checking. The term "packet" generally refers to encapsulated data at OSI layer 3.

In the present application, the term packet is intended to encompass packets, frames, and cells. In general, a packet format or frame format refers to how data is encapsulated with various fields and headers for transmission across a network. For example, a data packet typically includes an address destination field, a length field, an error correcting code (ECC) field or cyclic redundancy check (CRC) field, as well as headers and trailers to identify the beginning and end of the packet. The terms "packet format" and "frame format", also referred to as "cell format", are generally synonymous.

In order for a router or gateway to be able to interface between communication systems employing different packet or frame formats, the router or gateway is required to perform a packet conversion to convert the data from a first packet format used by the first communication system to a second packet format used by the second communication system. As the number of possible packet formats or types increases, the amount of logic required to convert between these different packet formats also increases.

Therefore, an improved communication system and method is desired which provides more efficient packet/frame conversion between devices using different packet/frame formats.

SUMMARY OF THE INVENTION

The present invention comprises a communication system which includes more efficient packet conversion and routing for improved performance and simplified operation. The communication system includes one or more inputs for receiving packet data and one or more outputs for providing packet data. The present invention includes an improved method for converting data packets between a plurality of different packet formats.

In one embodiment, the present invention comprises a "traffic circle" architecture for routing packet data and converting between different packet formats. In this embodiment, the system includes a data bus configured in a ring or circle. A plurality of port adapters or protocol processors are coupled to the ring data bus or communication circle. Each of the port adapters are configurable for converting between different types of communication packet formats. In the preferred embodiment, each of the port adapters are operable to convert between one or more communication packet formats to/from a generic packet format. The common generic packet format is then provided on the circular bus for circulation on a communication traffic circle between respective ones of the port adapters. Thus, packet data is received by a first port adapter and converted by the port adapter to the generic packet format. The generic packet format is then placed on the communication circle or bus and preferably accessed by a second port adapter. The second port adapter receives the data in the common generic packet format and converts the data to a second desired packet format for use within the communication system or for output on a port to another network or communication device. Thus, the communications traffic circle provides a circular data bus for interconnecting multiple communications ports. The communications traffic circle may also include buffers coupled to each of the port adapters for buffering data between the port adapter and communications traffic circle.

In a second embodiment, the present invention comprises a cross-bar switch communication channel. This system is designed to receive a plurality of communications channels comprising packet data. The communication system comprises a plurality of front-end adapters which provide electrical and signal interfacing with external communication signals to the on-chip digital logic. The system further includes a plurality of protocol converters or protocol processors for preferably converting possibly differing communication protocols or differing packet formats to/from a common generic packet format. Each of the protocol converters are coupled to a single-sided cross-bar switch to transmit/receive data to/from other protocol converters. A protocol converter first preferably converts data to the common generic packet format and then provides the data to the cross-bar switch, and a protocol converter receives data in the generic packet format from the cross-bar switch. The single-sided cross-bar switch is thus operable for interconnecting the multiple communications paths between arbitrary pairs of communications ports. The system preferably includes arbitration and control logic for establishing and removing connection paths within the cross-bar switch. In the preferred embodiment, the single-sided cross-bar switch is configurable for different transmission paths for added flexibility.

The method of the present invention uses a pre-defined generic packet format for simplified conversions. In order to convert a data packet from a first packet format to a second packet format, the method of the present invention first converts the data packet having the first packet format to a data packet having the predefined generic packet format. The method then converts the data packet having the pre-defined generic packet format to a data packet having the second packet format.

The method is thus operable to convert a data packet having any of a plurality of possible packet format types to the pre-defined generic packet format. The method is also operable to convert a data packet having the pre-defined generic packet format to a data packet having any of the plurality of possible packet format types. In the preferred embodiment, the plurality of possible packet format types comprise: TCP/IP, Ethernet, HDLC, ISDN, Lap B, ATM, X.25, Frame Relay, Digital Data Service, FDDI (Fiber Distributed Data Interface), T1, HFC and DSL.

Thus, the present invention comprises a system including a plurality of packet processors which operate to exchange packets in a common format, such as the generic format described above. The system includes either a circular/ring data bus or cross-bar switch for communicating data among a plurality of processors. Each of the plurality of processors can thus operate to exchange the instruction encoded packets in the common format.

Each of the plurality of processors are also operable to include instructions in an instruction field of a packet to create an instruction encoded packet. The instruction encoded packets include an instruction field comprising instructions and a data field comprising data. Each of the plurality of processors are also operable to execute instructions from the instruction field comprised in the instruction encoded packets. Each of the plurality of processors preferably comprise an identical instruction set for executing instructions in the instruction encoded packets. The instructions may direct a processor to perform operations on data comprised in the instruction encoded packets or perform routing operations on the instruction encoded packets.

One advantage of the present invention is that a number, k, of different protocols and formats may be supported with only k protocol converters, each of which can convert one of the k protocols to/from the generic protocol. Otherwise, k×(k−1)/2 converters would be necessary to convert between any of the k different protocols. The traffic circle embodiment of this invention provides a low cost implementation, while the crossbar switch embodiment provide a high performance implementation. Other realizations are possible, including multi-stage networks.

BRIEF DESCRIPTION OF THE DRAWINGS

A better understanding of the present invention can be obtained when the following detailed description of the preferred embodiment is considered in conjunction with the following drawings, in which:

FIG. 6 illustrates a cross-bar switch architecture according to another embodiment of the present invention;

DETAILED DESCRIPTION OF THE PREFERRED EMBODIMENT

Figure 1:
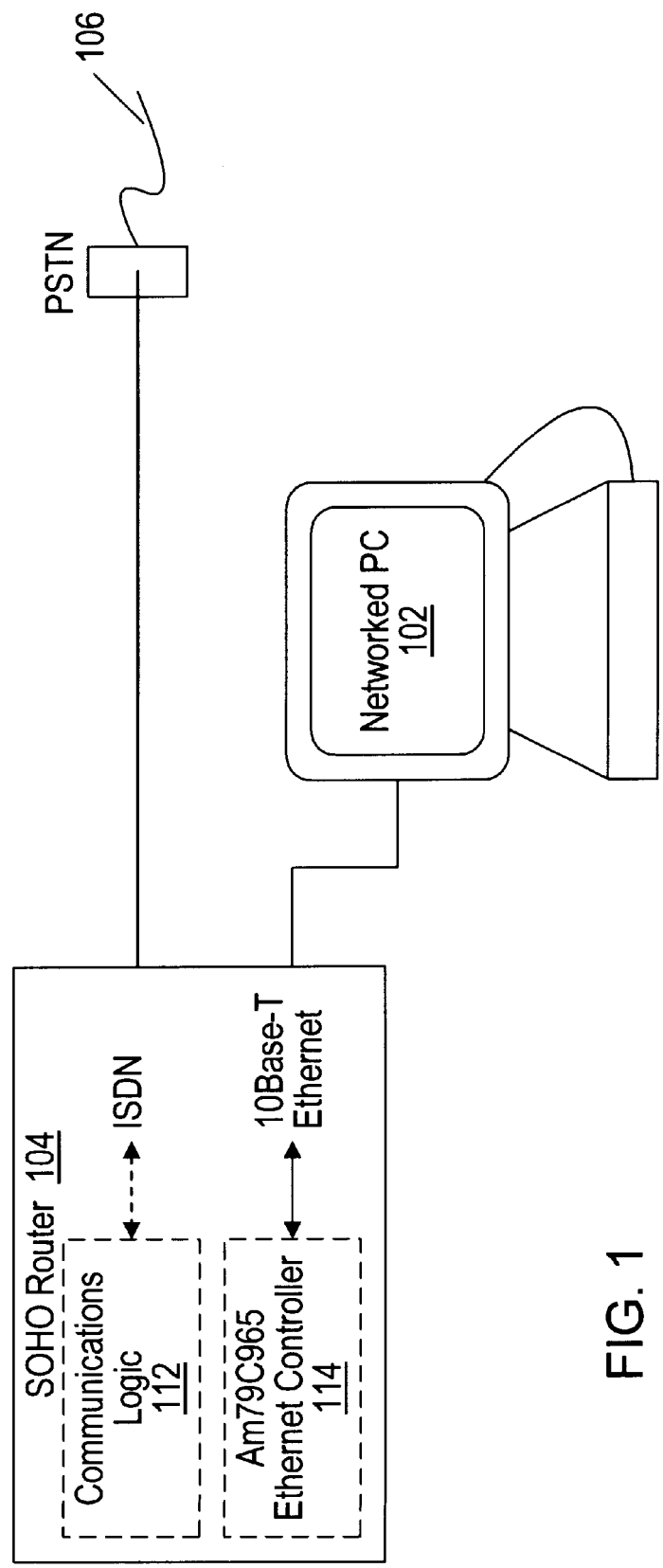
FIG. 1 illustrates a router which interfaces between a local area network and the PSTN and which includes improved packet conversion according to the present invention.

FIG. 1—Communication System

Referring now to FIG. 1, a communication system which incorporates the preferred embodiment of the present invention is shown. FIG. 1 illustrates a router 104 which connects to one or more networked computer systems 102 and which is operable to connect to the public switched telephone network (PSTN) 106. The router 104 includes communication logic 112 which provides more efficient packet conversion according to the present invention. However, it is noted that the present invention may be comprised in other types of communication devices or computer systems, as desired.

As shown, the router 104 interfaces to at least one computer system 102, preferably a networked computer system 102. The at least one networked computer system 102 may be part of a local area network (LAN). The router 104 may be configured to interface to any of various types of computer systems or networks. Thus, one or more of the networked computer systems 102 connect through the router 104 to the public switched telephone network (PSTN) 106.

The router 104 operates to route messages across different networks with different topologies. Router 104 also preferably performs gateway functions, i.e., the router includes logic for translating between different protocols. Thus, the router/gateway 104 can provide a link between a local area network represented by networked PC 102, and a completely different network type using a different transfer protocol. This enables, for example, a LAN to connect to a mainframe. More specifically, this allows an ISDN connection to interface to an Ethernet LAN or TCP/IP network, such as a UNIX network or the Internet. Thus, the router/gateway 104 operates at the top three layers of the OSI (open systems interconnection) model.

As discussed below, in one embodiment the router 104 includes a traffic circle architecture which facilitates packet conversion and routing. In another embodiment, the router 104 includes a cross-bar switch architecture for packet conversion and routing. The system also preferably uses a pre-defined generic packet format to facilitate conversions between different packet formats according to the present invention.

The router 104 may be adapted for connecting to various types of communication media. In the embodiment of FIG. 1, the router connects through the PSTN 106, wherein the PSTN may be standard plain old telephone service (POTS) or the ISDN (integrated services digital network). The router 104 may also be adapted to couple to an ATM (asynchronous transfer mode) network, an FDDI (fiber distributed data interface) network, an X.25 network, a synchronous optical network (SONET), ADSL (Asymmetric Digital Subscriber Line), or other types of communication protocols or media, as desired.

As shown, the router 104 includes communication logic 112. In the preferred embodiment, the communication logic 112 presents an ISDN interface for coupling to the PSTN 106. The router 104 also preferably includes an Ethernet controller 114 for coupling to an Ethernet local area network (LAN). As shown, the Ethernet controller 114 is coupled to the communication logic 112. The Ethernet controller 114 couples through a communication media to the local area network, represented by networked computer system 102. In the preferred embodiment, the Ethernet controller 114 is adapted to provide a 10Base-T Ethernet connection.

Figure 2:
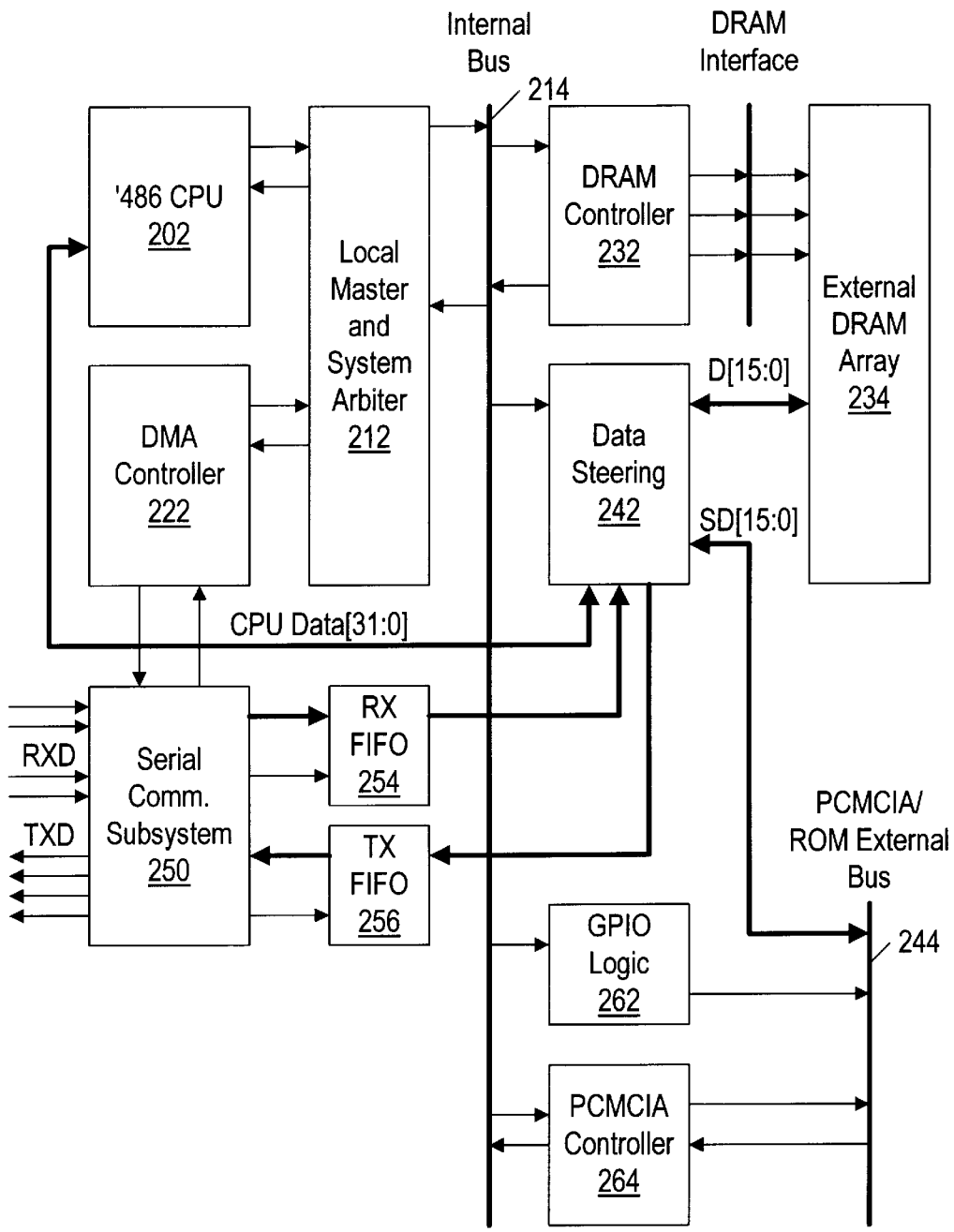
FIG. 2 is a block diagram of communication logic comprised in the router of FIG. 1.

FIG. 2—Communication Logic

Referring now to FIG. 2, a block diagram which illustrates the architecture of the communication logic 112 according to one embodiment of the present invention is shown. The communication logic 112 preferably comprises an embedded communication processing system. The communication logic 112 includes a system and method for performing packet format conversions with improved efficiency according to the present invention.

As shown, the communication logic 112 includes a central processing unit (CPU) 202. In the preferred embodiment, the CPU 202 is a 486 compatible microprocessor, such as the AM486 produced by Advanced Micro Devices. Other types of CPUs 202 may be used as desired.

As shown, the CPU 202 couples to Local Master and System Arbiter logic 212. The Local Master and System Arbiter 212 couples to an internal bus 214, referred to herein as the system bus 214. The Local Master and System Arbiter block 212 performs arbitration functions for controlling accessing to the system bus 214. The Local Master and System Arbiter logic 212 also performs bus mastering functions.

A direct memory access (DMA) controller 222 is coupled to the Local Master and System Arbiter logic 212. The DMA controller 222 performs direct memory access operations. Thus, the DMA controller 222 operates through the local master 212 to perform transfers between devices on the system bus 214 without requiring host CPU intervention, i.e., without requiring transfer or set-up operations to be performed by the CPU 202.

The communication logic 112 also preferably includes a memory controller 232 which couples to the system bus 214. The memory controller 232 comprised in the communication logic 112 is adapted for coupling to a memory array 234. As shown, the memory array 234 is preferably a dynamic random access memory (DRAM) memory array. In addition, the memory controller 232 is preferably a DRAM controller as shown.

A data steering logic block 242 is also coupled to the system bus 214. The data steering logic 242 couples to a PCMCIA/ROM external bus 244. The external bus 244 provides an interface for PC cards which are compatible with the personal computer memory card internal association (PCMCIA) standard. External bus 244 also provides an interface for ROM (read only memory) as well as other devices. The data steering logic 242 also couples through a data path to the external DRAM array 234. The data steering logic 242 further couples to the CPU 202, as well as to a receive FIFO device (RX FIFO) 254 and a transfer FIFO device (TX FIFO) 256.

The data steering logic 242 operates to provide data manipulation functions and data path transfers to allow each of the devices comprised in the communication system to operate using a single external memory array 234. For more information on the data steering logic 242, please see U.S. patent application Ser. No. 08/837,120, now U.S. Pat. No. 5,941,968 entitled "Computer System with Unified System Memory and Improved Bus Concurrency", filed on Apr. 14, 1997 (TT1295/AMD5000-67100), whose inventors are James Mergard, et al., which is hereby incorporated by reference in its entirety.

The communication system includes a serial communication subsystem 250. The serial communication subsystem 250 provides a serial communication interface to external communication media. As discussed above, in the preferred embodiment the router 104 provides an ISDN interface through the PSTN 106. Thus, the serial communication subsystem 250 preferably provides a serial interface for PSTN connectivity. As shown, the serial communication subsystem 250 includes a plurality of communication channel connections. In the preferred embodiment, the serial communication subsystem 250 includes a plurality of bi-directional communication channel ports. Each of the bi-directional communication channel ports is preferable programmable to operate as either an input or an output. In another embodiment, the serial communication subsystem 250 includes one or more dedicated receive data inputs (RXD) and one or more dedicated transfer data outputs (TXD).

The serial communication subsystem 250 is coupled to provide receive data to the receive FIFO 254. The receive FIFO 254 in turn provides data to the data steering logic 242. The serial communication subsystem 250 is also coupled to receive data from the transfer FIFO 256. The transfer FIFO 256 is in turn coupled to receive data from the data steering logic 242. In an alternate embodiment, the receive FIFO 254 and transfer FIFO 256 may be coupled directly to the system bus 214.

As mentioned above, in one embodiment the serial communication subsystem 250 includes a traffic circle architecture which facilitates packet conversion and routing. In another embodiment, the serial communication subsystem 250 includes a cross-bar switch architecture for packet conversion and routing. The serial communication subsystem 250 also preferably uses a pre-defined generic packet format to facilitate conversions between different packet formats according to the present invention.

As shown, the communication system 112 preferably includes general purpose input/output logic (GPIO logic) 262 which couples to the system bus 214, and which also couples to the PCMCIA/ROM External bus 244. The GPIO logic 262 provides general purpose input/output operations between the external bus 244 and the internal bus 214. The system further includes a PCMCIA controller 264 which is also coupled between the system bus 214 and the PCMCIA external bus 244. The PCMCIA controller 264 provides a PCMCIA standard interface for PC card devices.

Figure 3:
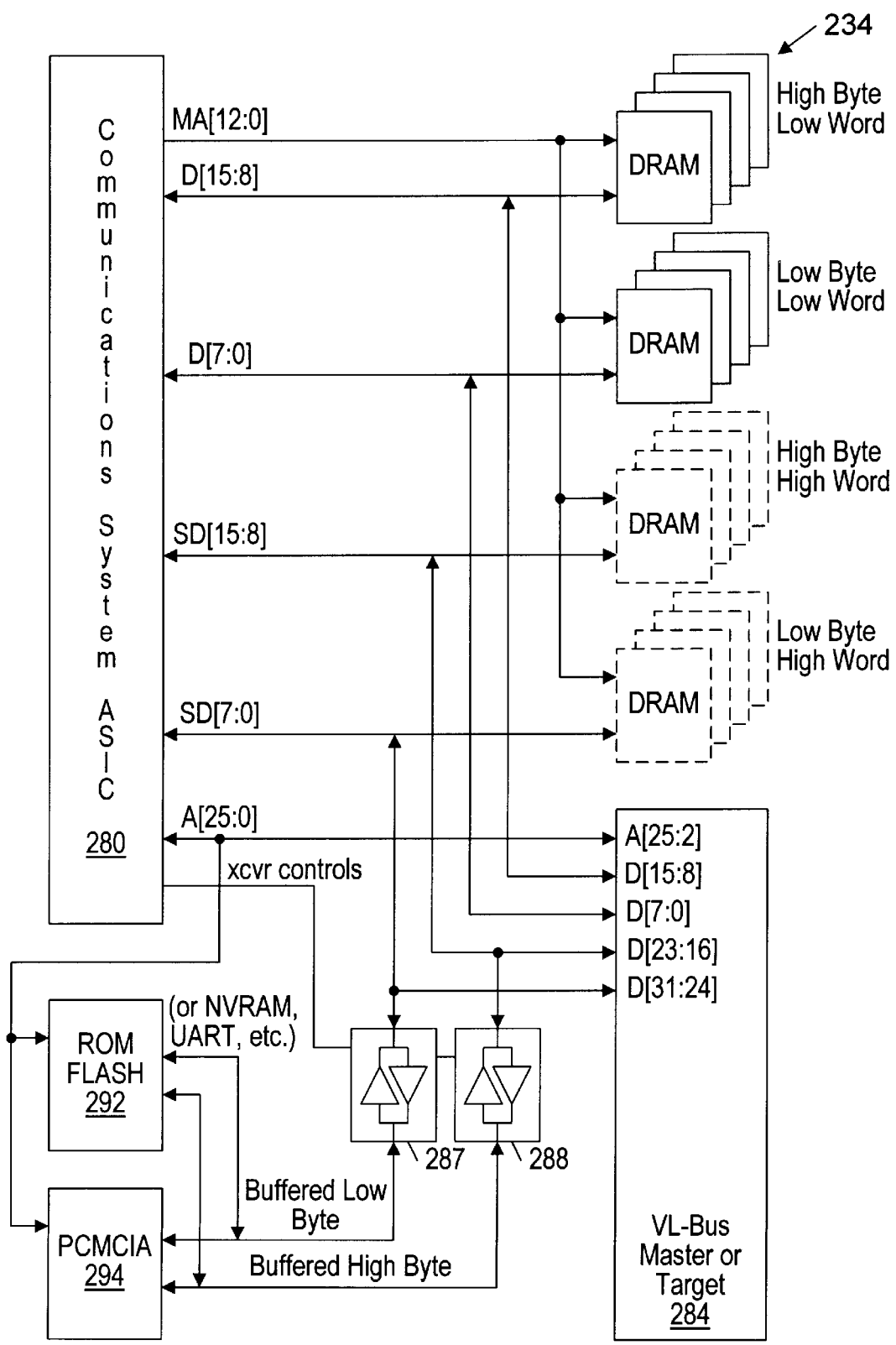
FIG. 3 illustrates the address/data path configuration of the communication system of FIG. 2.
Figure 4:
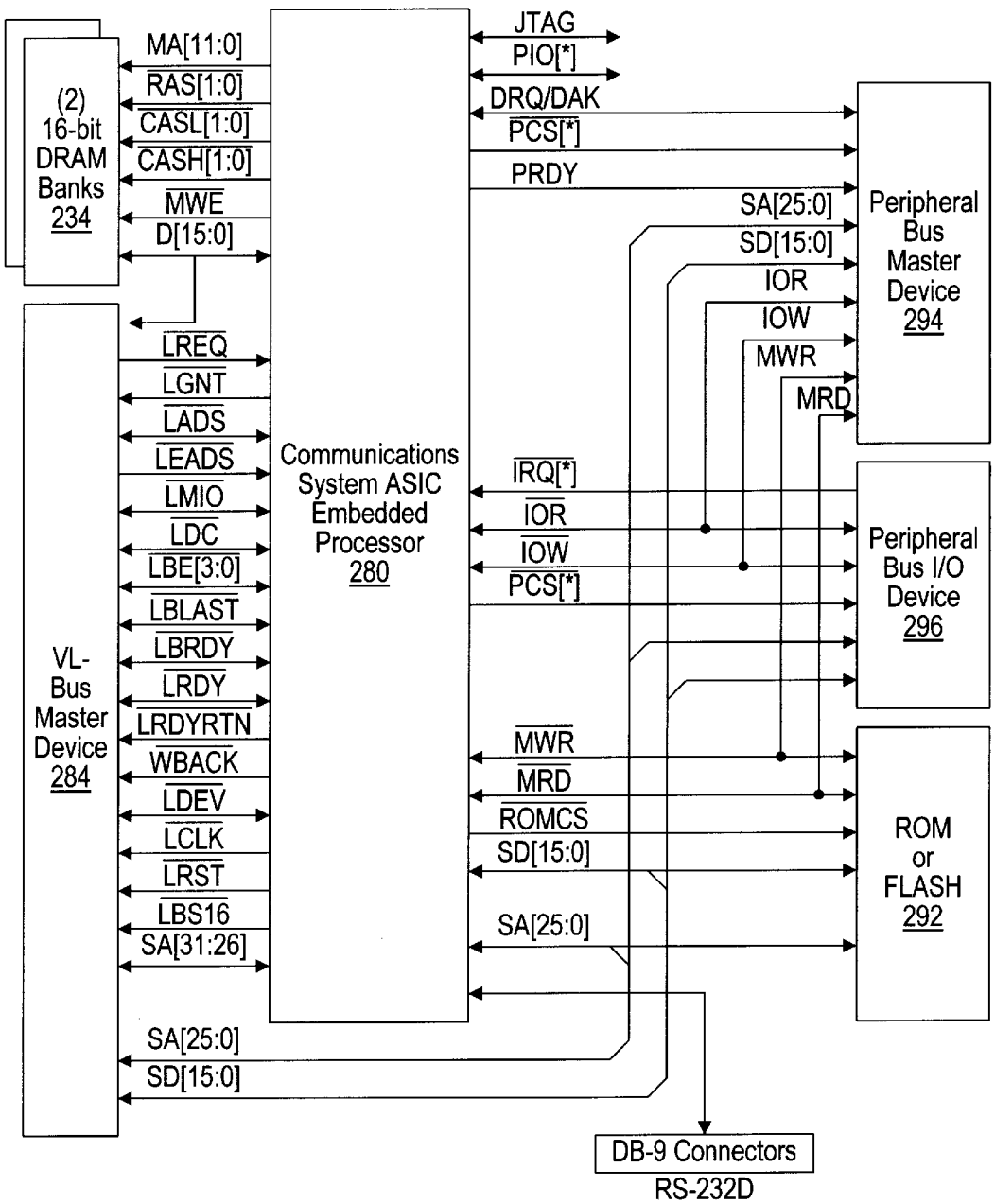
FIG. 4 is a block diagram of the logic devices comprised in the communication system of FIG. 2.

FIGS. 3 and 4—External Address/Data Bus and Control Signal Interface

FIG. 3 illustrates the communication system 112 partitioned according to the various discrete blocks according to the preferred embodiment. As shown, the communication system 112 preferably comprises a system ASIC (application specific integrated circuit) 280. The system ASIC 280 preferably incorporates the CPU 202, the DMA controller 222, the Local Master and System Arbiter logic 212, the system bus 214, the DRAM controller 232, the data steering logic 242, the receive and transfer FIFOs 254 and 256, the serial communication subsystem 250, the GPIO logic 262 and the PCMCIA controller 264. It is noted that the system of FIG. 2 may be implemented in various other ways, such as a plurality of discrete logic blocks or programmable logic, as desired.

As shown, the system ASIC 280 provides various address and data interfaces to the external DRAM array 234. In the embodiment of FIG. 3, the external DRAM array 234 comprises four banks of DRAM memories as shown. These four banks preferably comprise a high byte low word bank, a low byte low word bank, a high byte high word bank, and a low byte high word bank. It is noted that various other types of memory array configurations may be used as desired.

The system ASIC 280 preferably includes a system bus interface for external devices. As shown, the bus master or target device 284 may be coupled to the system ASIC 280. The bus master or target device 284 couples directly to the internal system bus 214 comprised in the communication logic 112. In the preferred embodiment shown in FIG. 1, the bus master or target device 284 comprises the Ethernet controller 114. FIG. 3 also illustrates bus transceivers 287 and 288, which provide the PCMCIA/ROM external bus interface 244. As shown, the external bus 244 is adapted for coupling to a ROM/Flash memory array 292 as well as PCMCIA interface logic 294. Various other devices may be connected to the external bus 244, including non-volatile random access memory (NVRAM) and a universal asynchronous receiver transmitter (UART) (both not shown), among others.

FIG. 4 is a block diagram similar to FIG. 3 which shows the various control signals provided each of the various logic devices of FIG. 3. Thus, FIG. 4 illustrates the system ASIC or embedded processor 280 coupled to the external memory 234, the master device 284, ROM/Flash memory 292, PCMCIA bus master device 294, and peripheral bus I/O device 296. The peripheral bus I/O device 296 may be a universal asynchronous receiver transmitter (UART) or other device. FIG. 4 also illustrates a serial interface provided by the system ASIC or embedded processor 280 as shown.

Figure 5:
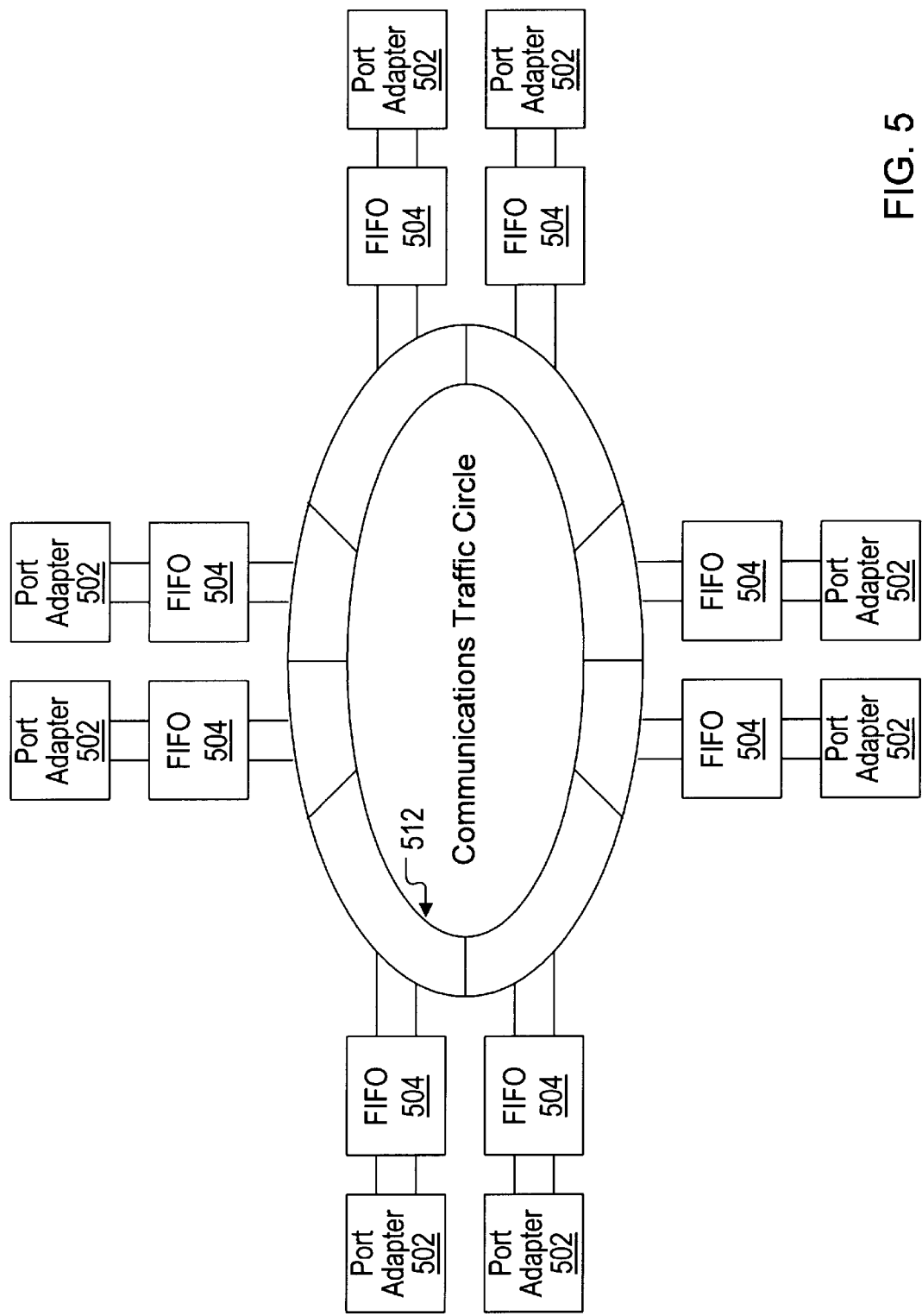
FIG. 5 illustrates a communication traffic circle architecture according to one embodiment of the present invention.

FIG. 5—Traffic Circle Architecture

Referring now to FIG. 5, a block diagram is shown illustrating the serial communications subsystem 250 according to a first embodiment. FIG. 5 illustrates the serial communications subsystem 250 configured according to a traffic circle or ring data bus architecture. As shown, the system 250 includes a data bus 512 configured in a ring topology or circle topology. The data bus 512 configured in the ring topology is referred to as a "communication traffic circle" or "circular data bus".

A plurality of packet processors or port adapters 502 are coupled to the data bus 512. The port adapters 502 comprise packet processing logic as well as a communication port for receiving/transmitting data. The system preferably includes a first in first out (FIFO) buffer 504 coupled between the circular data bus 512 and each of the port adapters 502. Each FIFO buffer 504 provides limited buffering between a communications port adapter 502 and the circular data bus 512. The plurality of processors or port adapters 502 are thus connected to the circular data bus 512 in a "ring" format, wherein the ring comprises the shared data bus 512 to which each of the processors 502 are connected. The data packets or instruction encoded packets are passed among the various processors 502 on the "ring" data bus. The processors or port adapters 502 may be any of various types of processing logic, including CPUs, microcontrollers, or other processing logic.

Each of the port adapters 502 include logic for converting between different packet formats. The plurality of processors or port adapters 502 exchange data packets according to the present invention. In the preferred embodiment, each of the port adapters 502 include logic for converting between one or more packet formats to/from a common generic packet format. As noted above, each port adapter 502 includes a communication port for receiving/transmitting data.

In the preferred embodiment, data is transferred on the ring data bus 512 in the generic format. Thus, a first packet processor 502 converts a packet in a first packet format to the generic format and places the data in the generic format onto the bus 512. A second packet processor 502 receives the packet data in the generic format and converts the data to a desired second packet format. The second packet format may be different than the first packet format, or may be the same packet format as the first packet format. In other words, the data may be converted from the first packet format to the generic packet format, and then may be converted from the generic packet format back to the first packet format, or to a different packet format as desired.

The data packets transferred on the bus 512 thus preferably all have a common format, preferably a generic format, and the processors 502 operate to exchange the data packets in the common format. In the preferred embodiment, each of the plurality of packet processors 502 are identical, and each uses an identical instruction set. More than one packet processor may receive the packet data from a single transmitting packet processor, in a multicast connection. Packets may be removed from the ring by the last receiving packet processor or by the sending packet processor.

In one embodiment, the plurality of packet processors or port adapters 502 exchange instruction encoded packets according to the present invention. In this embodiment, the data packets include a variable length instruction field where instruction code or subroutines are preferably stored. The instructions comprised in the instruction encoded packet may be used to perform operations on data comprised in the instruction encoded packets. The instructions comprised in the instruction encoded packet may also be used to perform routing operations on the instruction encoded packets. The instructions comprised in the instruction encoded packet may be executed to perform other operations, as desired.

The system shown in FIG. 5 preferably includes logic adapted to receive input data packets. The logic is operable to include or incorporate an instruction field comprising instructions within the one or more input data packets to produce instruction encoded packets. The instruction encoded packets include an instruction field comprising instructions and a data field comprising data. As mentioned above, the processors 502 are operable to exchange the instruction encoded packets and to execute instructions from the instruction field comprised in the instruction encoded packets.

The embedded code comprised within the instruction encoded or "smart" packet may be written by one port adapter 502 and executed by a second port adapter 502 or still other port adapters to perform operations on the packet data. Thus, the original data packet is received by a first port adapter 502, and the first port adapter 502 operates to wrap the packet with the instruction wrapper which includes the code subroutine. This "smart" packet may then be transferred to a second port adapter 502, which operates to execute the code subroutine comprised in the instruction encoded packet.

FIG. 6—Crossbar Switch Architecture

Referring now to FIG. 6, a block diagram is shown illustrating the serial communications subsystem 250 according to a second embodiment. FIG. 6 illustrates the serial communications subsystem 250 configured according to a crossbar switch architecture. As shown, the system 250 includes a plurality of inputs for coupling a plurality of communication channels. The communications channels are preferably received from external networks or devices. The system 250 also includes a plurality front-end adapters 562. The front-end adapters 562 provide electrical and signal interfacing of the external communications signals to the on-chip digital logic. The front-end adapters 562 include communication ports for transmitting/receiving data.

Each of the respective front-end adapters 562 are coupled to a respective FIFO buffer 564. Each of the FIFO buffers 564 are coupled to a respective protocol converter or protocol processor 566. The protocol converters or protocol processors 566 are interconnected via a single sided crossbar switch 570. Each FIFO buffer 564 provides limited buffering between the communication channels and the cross-bar switch 570.

Each of the protocol converters 566 are adapted for converting between one or more communications protocols or packet formats. This packet conversion is performed before transmission through or after reception from the cross-bar switch 570. In the preferred embodiment, each of the protocol converters 566 are adapted for converting differing communications protocols or packet formats to/from a common generic format. In the preferred embodiment, the protocol conversion logic 566 comprises configurable digital state machine logic. However, the protocol converters 566 may comprise processors, microcontrollers, programmable DSPs, or other programmable logic or discrete logic as desired.

The single-sided cross-bar switch 570 interconnects multiple communication paths between arbitrary pairs of communications ports. In the preferred embodiment, any connection to the switch may function as either an input or output connection. The system includes arbitration and control logic 572 coupled to the crossbar switch 570. The arbitration and control logic 572 is programmable to establish and remove connection paths within the switch 570. The control logic 572 is preferably dynamically programmable to dynamically configure the crossbar switch 570 during operation. Therefore, the cross-bar switch 570 provides complete interconnect flexibility between arbitrary ports with minimal delay while maximizing the interconnect bandwidth. The single sided crossbar switch 570 selectively provides interconnection between different communication ports for flexible system performance.

Therefore, a data packet having a first packet format is provided to a first front-end adapter 562 and is provided through the FIFO 564 to the corresponding protocol converter 566. The protocol converter 566 operates to convert the packet data having the first packet format to the generic packet format. The data in the generic packet format is then provided through the single-sided cross-bar switch 570 and is provided to a second protocol converter 566, or a plurality of converters 566 as configured by the crossbar connection. The cross-bar switch 570 routes the data from the first protocol converter 566 to a second protocol converter 566 based on the current configuration of the crossbar switch 570.

The second protocol converter 566 operates to convert the data from the generic packet format to a second desired packet format. As noted above, the second packet format may be the first packet format, i.e., a conversion back to the first packet format, or the second packet format may be a different packet format than the first packet format. The second protocol converter 566 then provides the data having the second packet format through the respective FIFO 564 and to the corresponding front-end adapter 562. The data having the second packet format is then provided to internal logic comprised within the communications system 112, or may be provided on an external port for communication to another network or communications device as desired.

The arbitration and control logic 572 also preferably performs arbitration among the protocol converters 566 to ensure that only one protocol converter 566 is communicating data through the crossbar switch 570 at any one time. It is noted that the cross-bar switch 570 may be configured to transmit to one other protocol converter (unicast), several other protocol converters (muilticast), or all the other protocol converters (broadcast), depending on the then current crossbar configuration. This provides a unique multiprotocol multicast or broadcast capability. Also, the traffic circle data bus 512 may be configured to transmit to one other protocol converter (unicast), several other protocol converters (muilticast), or all the other protocol converters (broadcast), depending on the then current traffic circle configuration.

Figure 7A:
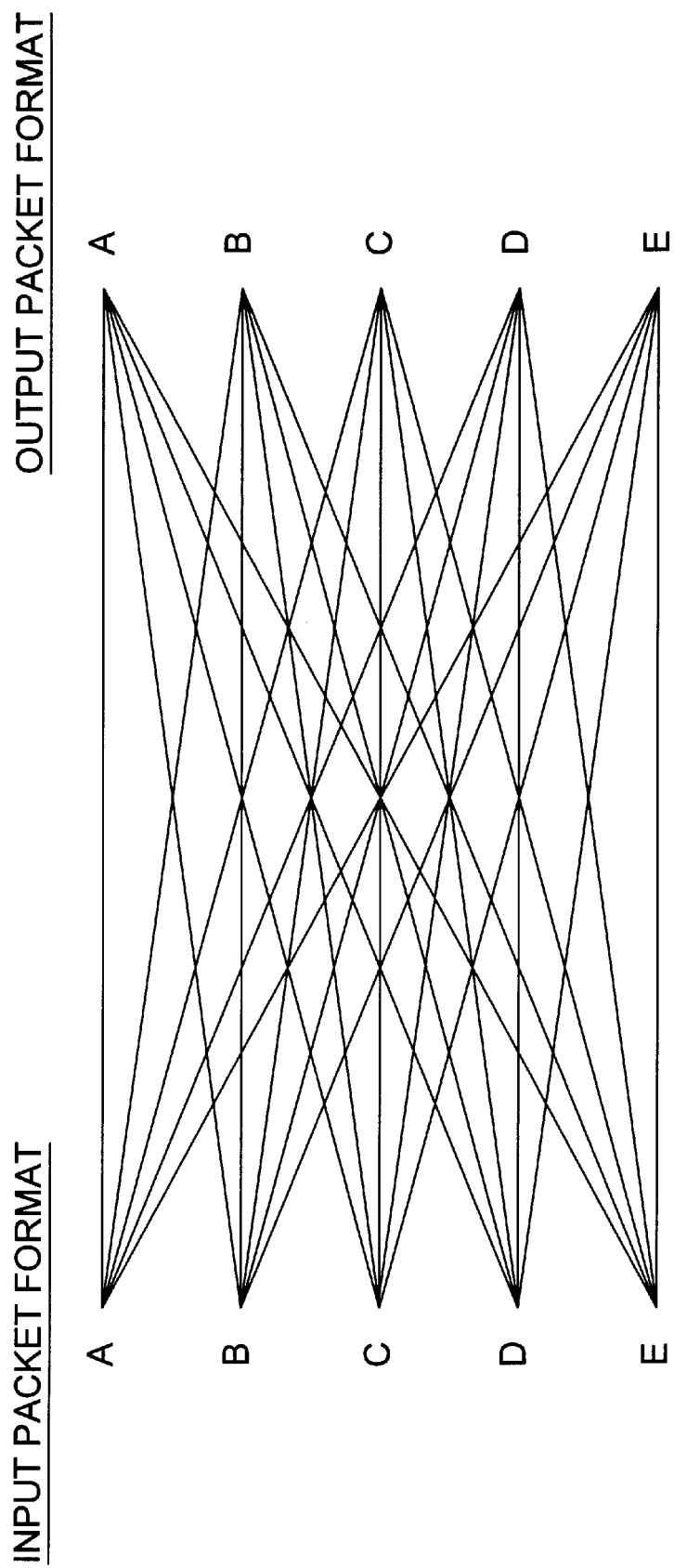
FIG. 7A illustrates prior art packet conversion.
Figure 7B:
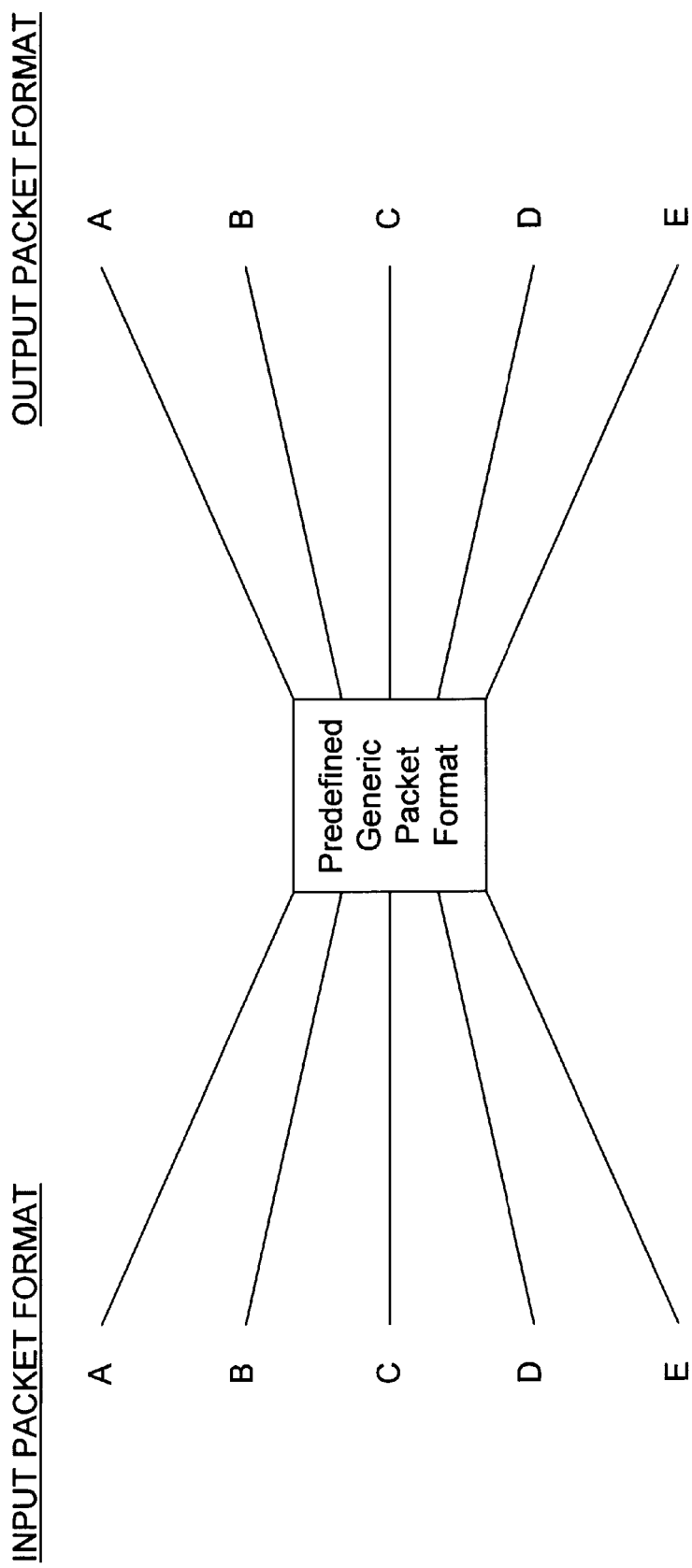
FIG. 7B illustrate packet conversion using a generic packet format according to the present invention.

FIGS. 7A and 7B—Operation of the Generic Packet Format

FIG. 7A illustrates prior art packet/frame conversion methods which assume a plurality of input packet formats or types on the left labeled A, B, C, D, E, and a plurality of output packet formats or types also labeled A, B, C, D, E, as shown. As discussed in the background section, prior art methods require dedicated conversion logic or software to perform packet format conversions between each input data packet type or format and each output data packet type or format. Thus, a developer would have to create individual dedicated logic or software modules, one for each combination of input and output packet format conversions, resulting in multiplicative complexity.

As shown in FIG. 7B, the system of the preferred embodiment converts data from any of various different types of input data packet formats to a common pre-defined generic data packet format. Once the data has been converted to this common generic data packet format, the data is then converted to the desired output data packet format as shown. This greatly simplifies the data packet format conversion method and allows simplified conversion for new packet types, requiring only additive complexity.

The method of the preferred embodiment uses a pre-defined generic packet format for simplified conversions. In order to convert a data packet from a fust packet format to a second packet format, the method of the present invention first converts the data packet having the first packet format to a data packet having the predefined generic packet format. The method then converts the data packet having the predefined generic packet format to a data packet having the second packet format.

For example, in the embodiment of FIG. 5, a first port adapter 502 receives packet data having a first packet format and converts this data to the generic packet format. This data is then provided onto the communications traffic circle 512 and is provided to a second port adapter. The second port adapter 502 operates to convert the data from the generic packet format to a second desired packet format. In the embodiment of FIG. 6, a first front-end adapter 562 receives the packet data according to a first packet format, provide the data to the corresponding protocol converter 566. The protocol converter 566 converts the data from the first packet format to the generic packet format. The data is then routed to the cross-bar switch in step 570 in the generic packet format as provided to a second protocol converter 566. The second protocol converter 566 converts the data to a desired second packet format, provides this data as an output of its respective front-end adapter 562.

The method is thus operable to convert a data packet having any of a plurality of possible packet format types to the pre-defined generic packet format. The method is also operable to convert a data packet having the pre-defined generic packet format to a data packet having any of the plurality of possible packet format types. In the preferred embodiment, the plurality of possible packet format types comprise: TCP/IP, Ethernet, HDLC, ISDN, Lap B, ATM, X.25, Frame Relay, Digital Data Service, FDDI (Fiber Distributed Data Interface), T1, HFC and DSL.

If the packet being converted includes embedded packet data, for example, an Ethernet packet which includes a data field comprising a TCP/IP packet the method preferably only converts the exterior or outer packet to the generic format leaving the embedded packet unchanged in the data field. Alternatively, the method converts both the exterior and interior packets to the generic format.

The pre-defined generic packet format comprises a superset of all of the plurality of possible packet format types. The pre-defined generic packet format comprises a type code field. The type code field stores a packet format type of the data packet which was converted to the predefined generic packet format. This type code information is used during the conversion from the pre-defined generic packet format to the second packet format.

The predefined generic packet format preferably also comprises a source address field which stores a source address value, a source address length field which stores information regarding size of the source address value, a destination address field which stores a destination address value, a destination address length field which stores information regarding size of the destination address value, a data field which stores a data value, and a data length field which stores information regarding size of the data.

In the embodiments of FIGS. 5 and 6, the present invention includes a system comprising a plurality of port adapters 502 or protocol converters 566 which operate to exchange packets in a common format, such as the generic format described above. In this embodiment, the system is operable to include an instruction field comprising instructions within each of the data packets to produce instruction encoded packets. The instruction encoded packets include an instruction field comprising instructions and a data field comprising data. Each of the plurality of port adapters 502 and/or protocol converters 566 operate to exchange the instruction encoded packets in the common format.

Each of the port adapters 502 and/or protocol converters 566, referred to generically as protocol processors, are operable to include instructions in an instruction field of a packet to create an instruction encoded packet. Each of the plurality of protocol processors is also operable to execute instructions from the instruction field comprised in the instruction encoded packets. Each of the plurality of protocol processors preferably comprise an identical instruction set for executing instructions in the instruction encoded packets. The instructions may direct a protocol processor to perform operations on data comprised in the instruction encoded packets or perform routing operations on the instruction encoded packets.

Figure 8:
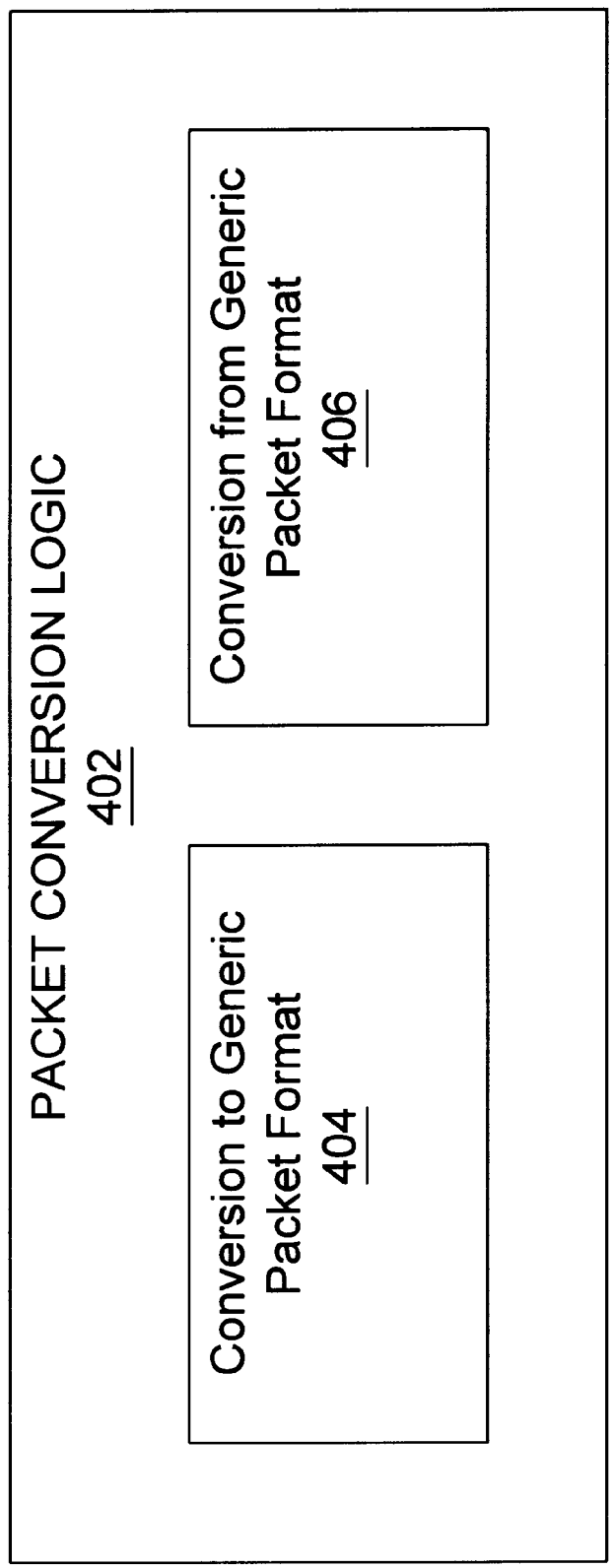
FIG. 8 illustrates packet conversion logic according to one embodiment of the invention.
Figure 9:
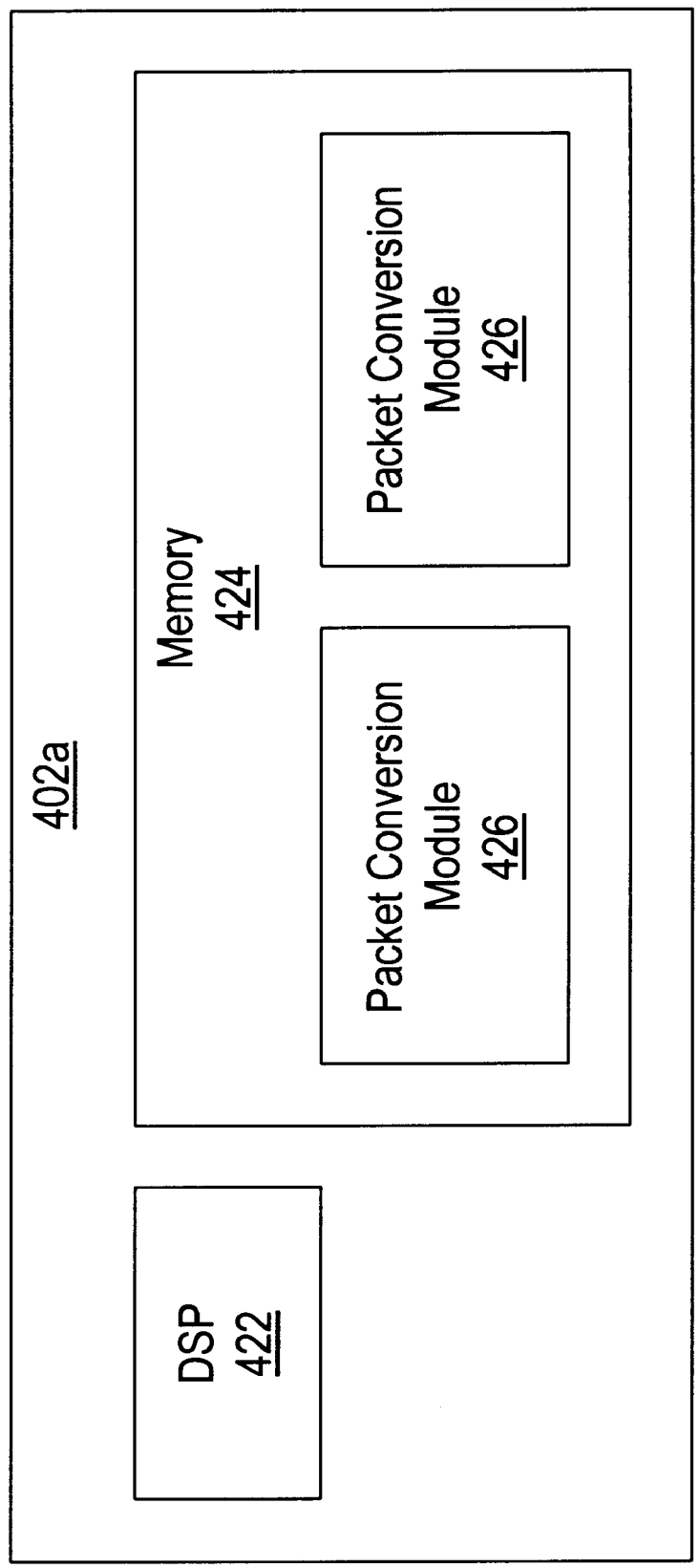
FIG. 9 illustrates packet conversion logic comprising a programmable digital signal processor (DSP) and associated memory.

FIGS. 8 and 9—Packet Conversion Logic

Referring now to FIG. 8, a block diagram illustrating packet conversion logic 402 according to the preferred embodiment of the invention is shown. In the embodiment of FIG. 5, the packet conversion logic 402 is comprised in each of the port adapters 502. In the embodiment of FIG. 6, the packet conversion logic 402 is comprised in each of the protocol converters 566.

The packet conversion logic 402 in the serial communications subsystem 250 includes an input which receives a data packet according to a first packet format or frame format. The packet conversion logic 402 also includes an output which produces a data packet according to a second (possibly different) packet format or frame format. It is noted that normally the same packet format is used for sending/receiving to/from a given external port. The packet conversion logic 402 operates to either: 1) receive a data packet in a first packet format and convert the data to the generic packet format; or 2) receive a data packet in the generic packet format and convert the data to a second packet format such as the first packet format in which the data was originally or a different packet format. In the first case, the received data packet has a first packet format from a plurality of possible packet format types, and the conversion logic 402 converts the data to the generic packet format. In the second case, the received data packet is in the generic packet format and the conversion logic 402 converts the data to a second packet format from a plurality of possible packet format types. According to the present invention, the generic packet format is used to convert between different ones of the plurality of possible packet format types, with packets arriving at one external port in the first packet format and exiting from another external port in the second packet format.

As shown, in the embodiment of FIG. 8 the packet conversion logic 402 includes a first block 404 which performs conversion of a data packet from any one of a plurality of packet or frame formats to the generic packet format. The packet conversion logic 402 also includes a second block 406 which performs conversion of a data packet in the generic packet format to any one of the plurality of packet or frame formats.

The conversion logic 404 includes an input which receives a data packet in the first packet format and an output which provides the data packet in the generic packet format. The conversion logic 404 in the packet conversion logic 402 operates to convert the data packet in the first format to the generic packet format. The conversion logic 406 includes an input which receives a data packet in the generic packet format and an output which provides the data packet according to a selected one of the plurality of possible packet format types.

Once the data packet has been converted to the generic format, the data packet in the generic format is provided by an output to the receive FIFO 254 and is processed in the system in this generic packet format. Thus, the received data packet is immediately converted to the generic packet format and the data is manipulated by the system in this generic packet format. When the system is ready to transmit the data packet to another system using a second different packet format, then the conversion logic 406 in the packet conversion logic 402 operates to convert the data packet from the generic packet format to the second packet format for transmission to the system. Thus, in this embodiment when a data packet having a first packet format type is received, the conversion logic 402 converts this data packet to the generic packet format and the data is manipulated within the system in this generic packet format. When the data packet is ready to be transmitted to another device using a second packet format type, the conversion logic 406 converts the data packet from the generic packet format to the second packet format type. The data in the second packet format type is then output to the respective device.

In an alternate embodiment of the present invention, the received data packet in the first packet format type is manipulated in the system in the first packet format type and is converted to the generic packet format and then to the second packet format just prior to transmission. Alternatively, the received data packet in the first packet format is converted to the generic packet format and then from the generic packet format to the second packet format, and the data packet in the second packet format type is manipulated within the communications system. This supports networks where one of several packet formats predominates and serves the role of the generic packet format.

In the embodiment shown in FIG. 8, the packet conversion logic 402 comprises discrete logic. In the preferred embodiment of the invention, as shown in FIG. 9, the packet conversion logic 402 comprises a programmable digital signal processor (DSP) 422 and associated memory 424. The DSP 422 performs the packet conversions to and from the generic packet format by executing software instructions from the memory 424. As shown, the memory 424 is operable to store one or more packet conversion modules 426. Each of the packet conversion modules 426 includes software for converting from/to a selected packet or frame type format to/from the generic packet format.

The packet conversion logic 402 is operable to convert between a plurality of different possible packet formats. Thus, the packet conversion logic 402 is operable to convert between each of these plurality of packet formats to/from the generic packet format. In the preferred embodiment, the plurality of possible packet format types comprise: TCP/IP (Transfer Control Protocol/Internet Protocol), Ethernet, HDLC, ISDN (Integrated Services Digital Network), LapB, LapM, ATM (Asynchronous Transfer Mode), X.25, Frame Relay, Digital Data Service, FDDI (Fiber Distributed Data Interface), T1, HFC (Hybrid Fiber Coax), SONET (Synchronous Optical Network) and Digital Subscriber Line (DSL). The term "Digital Subscriber Line" is intended to include ADSL (Asymmetric Digital Subscriber Line), SDSL (Symmetric Digital Subscriber Line), and HDSL (High bit-rate Digital Subscriber Line), as well as other subscriber line techniques.

The generic packet format of the present invention simplifies the development process when conversion is desired between existing packet format types and a new packet format type. In prior art systems, conversion modules or logic would be necessary to convert between each of the existing packet format types and the new packet format type. According to the present invention, conversion modules, or logic are only necessary between the new packet format type to/from the generic packet format. Once the new packet format type has been converted to the generic packet format, a number of modules already exist for converting from the generic packet format to each of the existing packet format types. Likewise, a number of modules already exist for converting from each of the existing packet format types to the generic packet format. Once an existing packet format type has been converted to the generic packet format, the generic packet format can then be converted to the new packet format type.

In many instances, a second packet format is embedded or comprised as the payload in a first packet format. For example, a TCP/IP packet is commonly comprised as the payload in an Ethernet packet. In the preferred embodiment, when a second packet format is embedded or comprised as the payload in a first packet format, the packet conversion logic 402 operates to convert the exterior or first packet format to/from the generic packet format, and leave the interior or second packet format unchanged as the payload of the newly created generic packet. Alternatively, the packet conversion logic 402 operates to convert both the exterior or first packet format and the interior or second packet format to/from the generic packet format.

Figure 10:
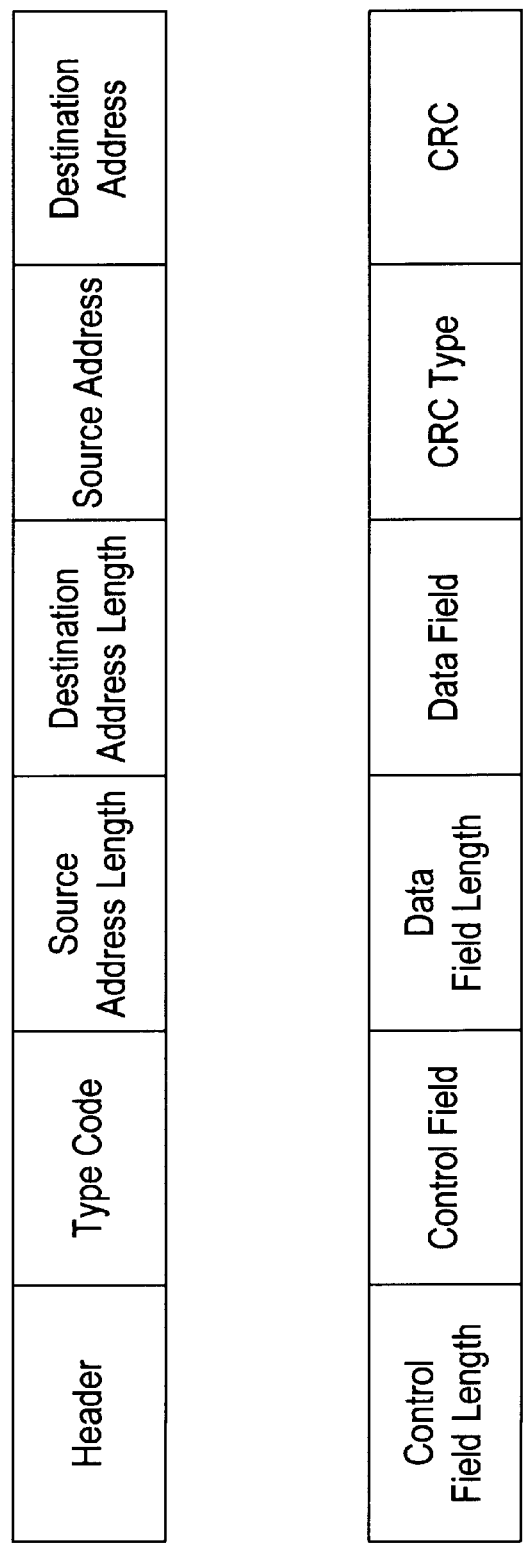
FIG. 10 illustrates the generic packet format according to the preferred embodiment of the present invention.

FIG. 10—Generic Packet Format

Referring now to FIG. 10, a diagram illustrating the generic packet format according to the preferred embodiment of the invention is shown. As shown, the generic packet format preferably comprises a header field, a type code field, a source address length field, a destination address length field, a source address field, a destination address field, a control field length, a control field, a data field length, a data field, a CRC (cyclic redundancy check) type field and a CRC field.

Each of the type and length codes or fields allows different address length, data length and control field types to be included within the packet format. Thus, each of the source address length and destination address length fields provide information on the length or size, i.e., the number of bytes, comprised in the source address field and the destination address field, respectively. Likewise, the control field length comprises information regarding the number of bytes of the subsequent control field. In a similar manner, the data field length comprises information on the number of bytes comprised in the data field portion. When the type code or length field comprises the number 0, this indicates that the subsequent or corresponding field is vacant and not used. Thus, if the control field length is 0, then the control field is vacant or unused.

The type code field comprises information identifying the packet format type of the data packet which was converted to said predefined generic packet format. In other words, if the packet conversion logic 402 converts a data packet from a first packet format to a second packet format, the type code field identifies the first packet format from which the data packet was converted from. This information is provided in the generic packet because it may be useful in the conversion process from the generic packet format to a second packet format. The control field stores various control information.

It is noted that the generic packet format shown in FIG. 10 is illustrative only, and other types of generic or intermediate data packet formats can be used according to the present invention.

The intermediate or generic packet format used according to the present invention enables direct transmittal of frame/ packet data between two or more communication controllers supporting different packet/frame formats. This allows, for example, a received data packet conforming to the TCP/IP packet format to be received, converted to the generic packet format, and then be converted to any of various other types of packet formats, such as ISDN or Ethernet. Likewise, the present invention allows any of various types of received data packet formats to be easily converted to any of various output data packet formats. The present invention further simplifies the development of packet conversion modules.

As mentioned above, the use of the generic packet format obviates the necessity the programmer or developer having to develop hardware and/or software to convert between each of the respective input data packet formats and each of the respective output data packet formats. However, using the generic data packet format of the present invention, conversion modules or hardware can be developed to convert from each of the respective data packet formats to the generic packet format, and likewise to convert from the generic data packet format to each of the plurality of the respective data packet formats. This greatly simplifies the process of creating hardware and/or software for converting between different data packet formats.

Figure 11:
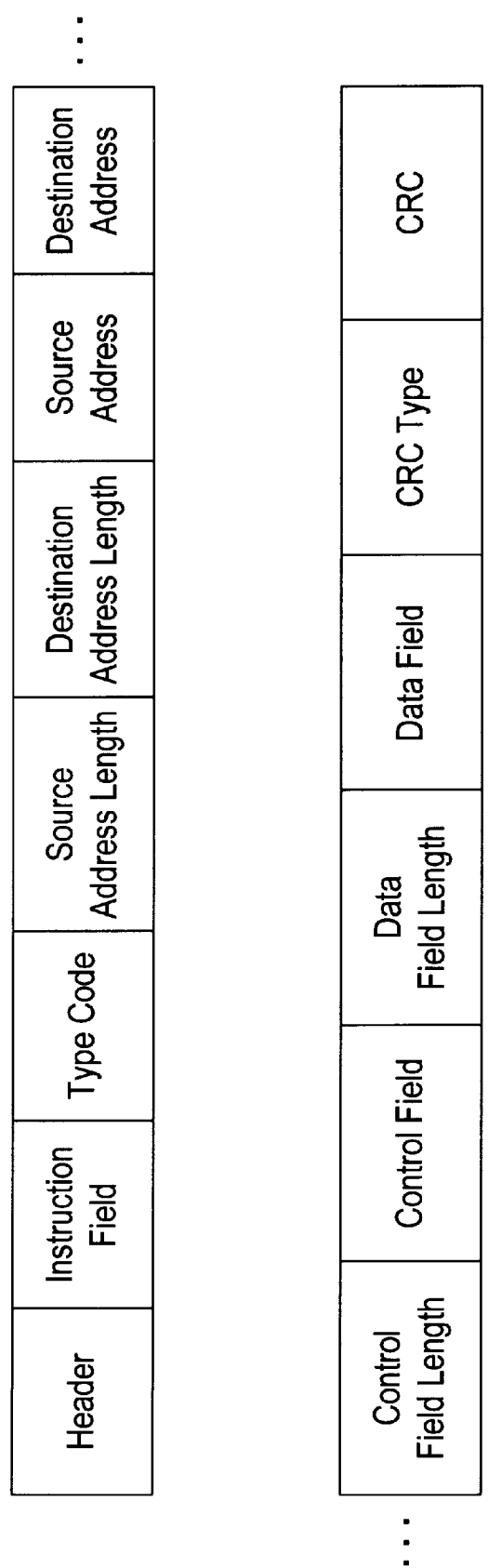
FIG. 11 illustrates the generic packet format including an instruction field according to another embodiment of the present invention.

FIG. 11—Generic Packet Format with Instruction Field

The generic packet format of the present invention can be used to provide a single internal packet format for unified routing within the communications system 112. Referring now to FIG. 11, in one embodiment of the invention the generic packet format includes an instruction field for storing instructions or a subroutine. The instructions are used within the communications system 112 to operate on the data comprised in the generic packet. The incorporation of an instruction field within the generic packet format provides a convenient mechanism for attaching instructions to a data packet. This provides for simplified routing of data and corresponding instructions within the communication system.

Figure 12:
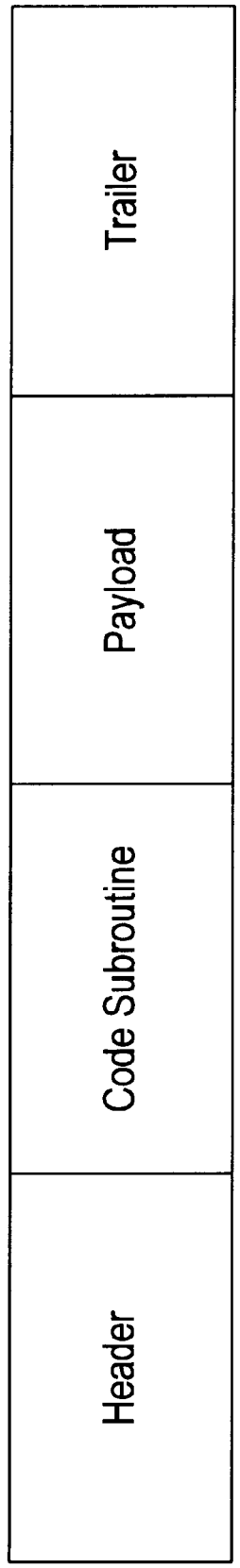
FIG. 12 illustrates an instruction encoded packet including a packet wrapper for unified routing, wherein the instruction encoded packet includes an instruction field.

FIG. 12—Packet Wrapper for Unified Routing Architecture

In another embodiment of the invention, the communications system 112 operates to provide a separate packet wrapper around received packet data to provide for unified routing within the communications system 112. This embodiment operates to place a packet wrapper around the received packet data, wherein the packet wrapper comprises a variable length field storing code or instructions which are used during the routing process. As shown in FIG. 12, the instruction packet wrapper comprises a header followed by a code subroutine which is then followed by the payload, i.e. the original data packet, and a trailer. Thus, the received data packet, referred to as the payload, is enveloped or wrapped with a data packet wrapper comprising the header, code subroutine and trailer. The payload may comprise the data packet received or a data packet to be transmitted. Alternatively, the payload may also comprise a data packet which has already been converted to the generic packet format as described above. In the present disclosure, a packet which includes an instruction field is referred to as an instruction encoded packet or a "smart" packet.

Figure 13:
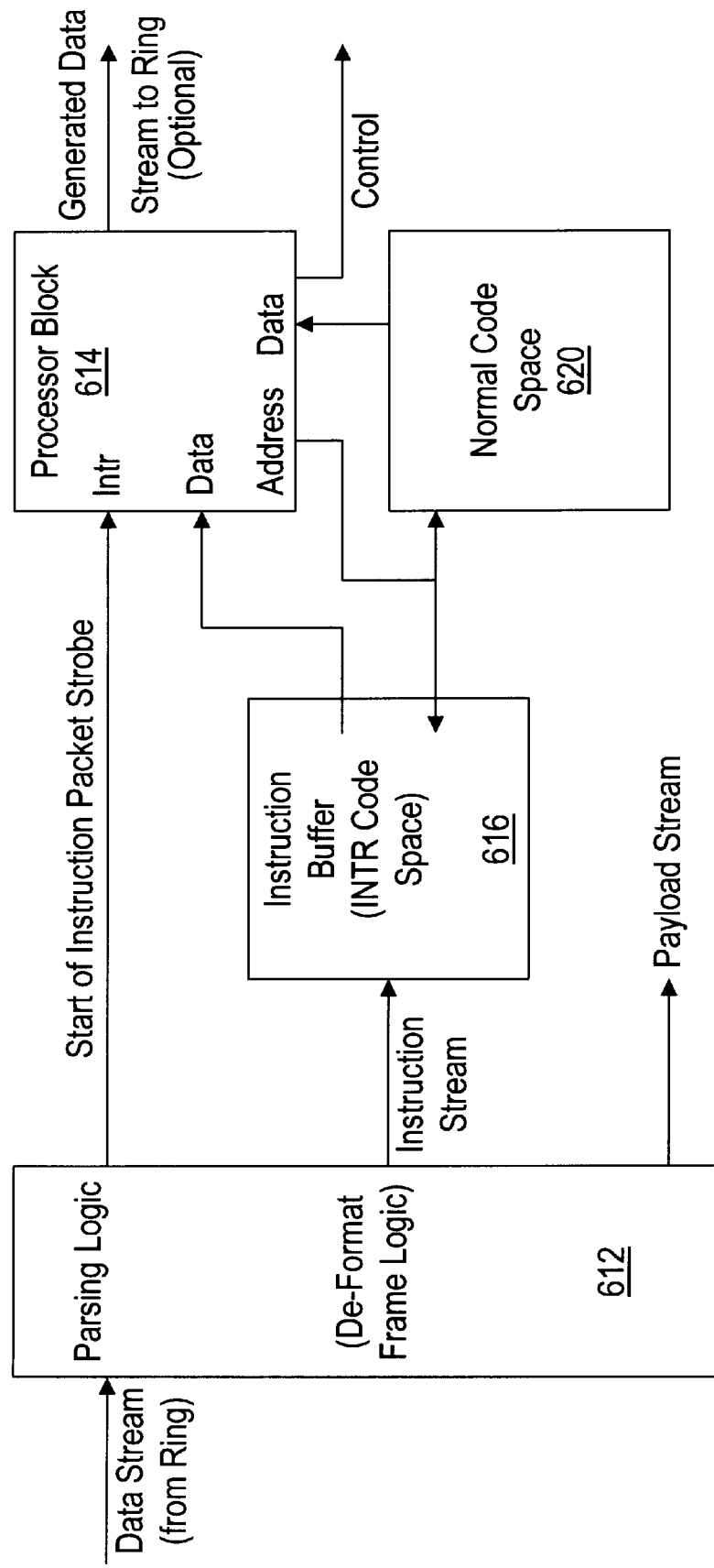
FIG. 13 is a block diagram illustrating one of the processors of FIG. 5 or 6.

FIG. 13—Protocol Processor Block Diagram

Referring now to FIG. 13, a block diagram illustrating a portion of one of the protocol processors, such as port adapter 502 or protocol converter 566, comprised in the systems of FIGS. 5 or 6 is shown. FIG. 13 illustrates a portion of the protocol processor which parses and executes instructions within an instruction encoded packet. As shown, this portion of logic comprises parsing logic 612, also referred to as de-format logic 612, an instruction buffer 616, a processor block 614, and a normal code space memory 620. The logic shown in FIG. 13 is described with reference to the system of FIG. 5.

The parsing logic or de-format logic 612 receives the data stream comprising one or more instruction encoded packets according to the present invention. The instruction encoded packets may comprise a packet in the generic packet format which includes an instruction field, as shown in FIG. 11. The instruction encoded packets may be generalized as including an instruction field and a data payload as shown in FIG. 12, wherein the data payload may be in the generic packet format or other packet formats, as desired.

As shown, the logic block 612 outputs a strobe signal indicating the start of the instruction packet to a processor block 614. The start of instruction packet strobe which is provided to the processor block 614 is provided to the interrupt input (intr) of the processor block 614. The logic block 612 operates to parse or de-format the frame, i.e. to strip off the instruction or code subroutine field from the payload. The logic block 612 outputs an instruction stream comprising the instruction or code subroutine to an instruction buffer 616 as shown. The instruction buffer 616 is coupled to provide instruction data to the processor block 614. The logic block 612 also outputs the payload stream, as shown.

The processor block 614 is coupled to provide an address output to each of the instruction buffer 616 and the normal code space memory 620. In response to a received address, the instruction buffer 616 operates to provide instruction data comprising the encoded instructions to the processor block 614. The processor block 614 thus receives the instructions from the instruction buffer 616 and executes these instructions to perform the desired operations. As discussed above, these instructions may direct the processor block 614 to manipulate the data or route the packet in a certain manner, as desired. The processor block 614 may also add additional instructions for use by another processor 602. The normal code space memory 620 stores code and data used by the processor block 614.

The processor block 614 outputs a data stream back onto the ring or shared data bus 512 as shown. The processor block 614 preferably outputs data in the common instruction encoded format. Processor block 614 also provides output control signals as shown.

Therefore, in this embodiment, the present invention formulates received packet data into a common format, preferably comprising an instruction field. The instruction field is usable by one or more of a plurality of microcontrollers or protocol processors 502 or 566 for performing operations on the packet or on the data comprised within the packet. The present invention thus provides a simplified or convenient mechanism for embedding instruction or code subroutines within received packet data. The traffic circle architecture and the crossbar switch architecture proved an improved system architecture for routing data packets and performing packet or protocol conversions.

Conclusion

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A communications system providing data packets between a plurality of communications ports comprising:

a circular data bus, wherein the circular data bus is operable to transmit data packets;

a plurality of communication ports coupled to the circular data bus, wherein the plurality of communication ports are operable to transmit and receive data packets;

a plurality of processors coupled to the circular data bus and said plurality of communication ports;

wherein each of said plurality of processors are operable for converting data packets between two or more packet formats;

wherein each of the plurality of processors are operable to receive data packets from a communication port and provide the data onto the circular data bus, wherein each of the plurality of processors are operable to obtain data packets from the circular data bus and provide said data packets to one of said communication ports; and wherein at least one of said two or more packet formats includes an instruction field for storing instructions, wherein one or more of the plurality of processors are operable to encode said instructions into the instruction field, wherein one or more of the plurality of processors are operable to execute said instructions from the instruction field, wherein the instruction stored in the instruction field are used by said one or more of the plurality of processors to operate on data in the data packets.

2. The communications system of claim 1, further comprising:

a plurality of buffers, wherein each of the plurality of buffers is coupled between a respective communication port and the circular data bus;

wherein the plurality of buffers are operable for buffering data between a respective communication port and the circular data bus.

3. The communications system of claim 2, wherein each of the plurality of buffers is coupled between one of the plurality of processors and the circular data bus;

wherein the plurality of buffers are operable for buffering data between the plurality of processors and the circular data bus.

4. The communications system of claim 1, wherein each of the plurality of processors are operable to convert data packets to/from a generic packet format, wherein data packets are transferred on the circular data bus in the generic packet format.

5. The communications system of claim 4, wherein the plurality of processors includes a first processor which receives data packets having a first packet format from a communication port and converts the data packets to the generic packet format, wherein the first processor provides the data packets in the generic packet format onto the circular data bus; and wherein the plurality of processors includes a second processor which receives data packets having the generic packet format from the circular data bus and converts the data packets to a second packet format, wherein the second processor provides the data packets in the second packet format onto a communication port.

6. The communications system of claim 5, wherein the second packet format is the same packet format as the first packet format.

7. The communications system of claim 4, wherein the generic packet format includes an instruction field for storing instructions.

8. The communications system of claim 1, wherein the circular data bus is configured in a ring topology.

9. The communications system of claim 1, wherein data packets remain on the circular data bus until one or more of said processors retrieves said data packets.

10. The communications system of claim 1, wherein one of said plurality of processors is configurable to transmit data packets to a plurality of said plurality of processors in a multicast or broadcast fashion.

11. A communications system providing data packets between a plurality of communications ports, comprising:

a circular data bus, wherein the circular data bus is operable to transmit data packets;

a plurality of communication ports coupled to the circular data bus, wherein the plurality of communication ports are operable to transmit and receive data packets; and a plurality of processors coupled to the circular data bus and said plurality of communication ports;

wherein each of said plurality of processors are operable for converting data packets to/from a generic packet format, wherein data packets are transferred on the circular data bus in the generic packet format, wherein the generic packet format includes an instruction field for storing instructions;

wherein each of the plurality of processors are operable to receive data packets from a communication port and provide the data packets onto the circular data bus, wherein each of the plurality of processors are operable to obtain data packets from the circular data bus and provide said data packets to one of said communication ports;

wherein one or more of the plurality of processors are operable to encode said instructions into the instruction field, and wherein one or more of the plurality of processors are operable to execute said instructions from the instruction field to operate on data in the data packets.

12. The communications system of claim 11, wherein the plurality of processors includes a first processor which receives data packets having a first packet format from a communication port and converts the data packets to the generic packet format, wherein the first processor provides the data packets in the generic packet format onto the circular data bus; and wherein the plurality of processors includes a second processor which receives data packets having the generic packet format from the circular data bus and converts the data packets to a second packet format, wherein the second processor provides the data packets in the second packet format onto a communication port.

13. The communications system of claim 12, further comprising:

a plurality of buffers, wherein each of the plurality of buffers is coupled between a respective communication port and the circular data bus;

wherein the plurality of buffers are operable for buffering data between the respective communication port and the circular data bus.

14. A method for converting data packets between a plurality of different packet formats, wherein each of said plurality of different packet formats includes an instruction field, the method comprising:

receiving a first data packet from a communication port, wherein said first data packet has a first packet format from a plurality of possible packet format types, wherein the first packet format includes an instruction field, wherein one or more instructions stored in the instruction field are used to operate on data in the data packets;

a first processor converting the first data packet having said first packet format to a data packet having a predefined generic packet format, wherein the generic packet format includes an instruction field, wherein one or more instructions in the instruction field was executed by the first processor;

the first processor placing said data packet having said predefined generic packet format onto a circular data bus;

the data packet having said predefined generic packet format traveling on said circular data bus;

a second processor retrieving the data packet having said predefined generic packet format from said circular data bus;

the second processor converting the data packet having said predefined generic packet format to a second data packet having a second packet format, wherein said second packet format is one of said plurality of possible packet format types, wherein said second data format includes an instruction field;

providing said second data packet having said second packet format out a communication port.

15. The method of claim 14, wherein said first packet format and said second packet format comprise ones of said plurality of possible packet format types;

wherein said converting the first data packet having said first packet format to the data packet having said predefined generic packet format is operable to convert a data packet having any of said plurality of possible packet format types to the predefined generic packet format;

wherein said converting the data packet having said predefined generic packet format to the second data packet having the second packet format is operable to convert a data packet having said pre-defined generic packet format to any of said plurality of possible packet format types.

16. The method of claim 15, wherein said predefined generic packet format comprises a superset of all of said plurality of possible packet format types.

17. The method of claim 14, wherein said plurality of possible packet format types comprise two or more of: TCP/IP, Ethernet, HDLC, ISDN, Lap B, ATM, X.25, Frame Relay, Digital Data Service, FDDI (Fiber Distributed Data Interface), T1, HFC and DSL.

18. The method of claim 14, wherein the second packet format is the same packet format as the first packet format.

19. The method of claim 14, wherein the second processor retrieving the data packet having said predefined generic packet format from said circular data bus comprises a plurality of second processors retrieving the data packet having said predefined generic packet format from said circular data bus in a multicast or broadcast fashion;

wherein the second processor converting the data packet comprises the plurality of second processors each converting the data packet having said predefined generic packet format to new data packets having respective packet formats, wherein each of said respective packet formats is one of said plurality of possible packet format types;

wherein said providing comprises providing said new data packets having said respective packet formats out respective communication ports.

20. The method of claim 14, further comprising:

the second processor executing one or more instructions included in said instruction field, wherein said one or more instructions direct the second processor to operate on data in the data packet.

21. The system of claim 1, wherein the instruction field is a variable length instruction field.

* * * * *